United States Patent [19]

Mester

[11] Patent Number: 4,943,019
[45] Date of Patent: Jul. 24, 1990

[54] LEVELLING SYSTEM FOR CAMERA CRANES

[75] Inventor: Gyula Mester, Muenster, Fed. Rep. of Germany

[73] Assignee: Technovision Cameras Limited, England; a part interest

[21] Appl. No.: 292,437

[22] Filed: Dec. 30, 1988

[51] Int. Cl.$^5$ ............................................. G03B 17/00
[52] U.S. Cl. .................................. 248/123.1; 74/425; 318/265; 318/286; 318/466
[58] Field of Search ...................... 248/121, 122, 123.1, 248/124, 550, 185; 74/425; 182/2, 19; 318/466, 265, 286

[56] References Cited

U.S. PATENT DOCUMENTS

| | | | |
|---|---|---|---|
| 2,073,998 | 3/1937 | Raby | 248/124 |
| 2,084,643 | 6/1937 | Johnson | 248/124 |
| 2,156,862 | 5/1939 | Maugard | 248/123.1 |
| 2,224,901 | 12/1940 | Cunningham | 248/123.1 |
| 3,352,521 | 11/1967 | Tyler | 248/123.1 |
| 3,613,546 | 10/1971 | Richardson | 248/74.1 |
| 4,838,117 | 6/1989 | Bittner | 74/425 |

Primary Examiner—Ramon O. Ramirez
Assistant Examiner—Robert A. Olson
Attorney, Agent, or Firm—Brown, Martin, Haller & McClain

[57] ABSTRACT

A levelling system for a camera crane employs a tachometer directly coupled to a horizontal pivot of the crane. The output of this tachometer is used to control a motor which by means of a worm and worm gear controls the level of a camera remote head. A second tachometer is associated with the worm in order to provide a feedback signal to the servo-amplifier so as to maintain the motions of the boom about the pivot and the worm gear in synchronism.

6 Claims, 4 Drawing Sheets

LEVELLING SYSTEM FOR CAMERA CRANES

BACKGROUND OF THE INVENTION

1. Technical Field

The present invention relates to a levelling system for a camera crane.

When a film or video camera is mounted on a remote head secured to a levelling head fixed to the end of a boom of a crane so that the camera can move during filming, it is essential that a platform on which the camera is supported be maintained level at all times.

2. Prior Art

Camera cranes have been employed in the past. However, since it has been necessary to employ a fixed mechanical (parallelogram) arrangement for keeping the camera remote head level during crane movement, it has only been possible to carry out luffing motion to change the elevation of the crane or slewing motion to rotate the crane boom about a vertical supporting pivot during filming. The boom length can only be altered by removing and refitting the mechanical linkage of the levelling system. It will be appreciated that more spectacular effects can be created if not only the elevation but the boom length of the camera crane can be moved during filming while maintaining the camera remote head level at all times.

On some existing camera cranes, a platform or levelling plate is provided at the end of the boom. This platform is sufficiently large to allow a camera operator and his assistant to sit on it together with the camera mounted on a tripod which also rests on the platform. Since filming during crane movement from such a platform can be dangerous, it is preferred to mount the camera on a remote head which allows the camera to be rotated about a vertical and a horizontal axis relative to the levelling plate to which the remote head is fitted. A typical electrically controllable remote head of this type is manufactured by Technovision Cameras Ltd. This remote head is provided with electrical connections via slip-rings so that there is no limitation of rotation of the camera in either axis. Movement of the camera as well as all camera functions, such as the power control, the running control, focus, iris and zoom controls are remotely controllable from the ground by electrical means. In implementing the present invention, it is proposed to use such a conventional remote head.

SUMMARY OF THE INVENTION

It is an object of the invention to provide a control system for maintaining a camera remote head level, which system does not require any fixed-length mechanical linkage between a horizontal pivot of the boom and a levelling head to which the remote head is secured.

The control system of the present invention is based upon electronics to control the relationship between the movement of the camera remote head and that of the boom.

The preferred system uses a tachometer coupled directly to the horizontal pivot of the boom in order to provide a signal to control a motor at the levelling head which controls the movement of the camera remote head.

In order to eliminate the errors due to backlash, it has been found that the best results are obtained by coupling the tachometer or a shaft encoder directly to the horizontal pivot of the boom so that the signal obtained for controlling the motor at the levelling head is, as far as possible, directly related to the angle of elevation and speed of the crane's luffing motion.

Since it may not be possible to obtain a precisely linear output from a tachometer at very slow speeds of luffing, it is proposed in a preferred embodiment to provide a feedback signal from a level sensor fixed to a levelling plate of the levelling head to which plate the camera remote head is directly mounted in order to sense any deviation of the levelling plate from a precise level.

A levelling system in accordance with a preferred embodiment of the present invention will now be described, by way of example only, with reference to the accompanying diagrammatic drawings.

DESCRIPTION OF A PREFERRED EMBODIMENT

Figure 1:
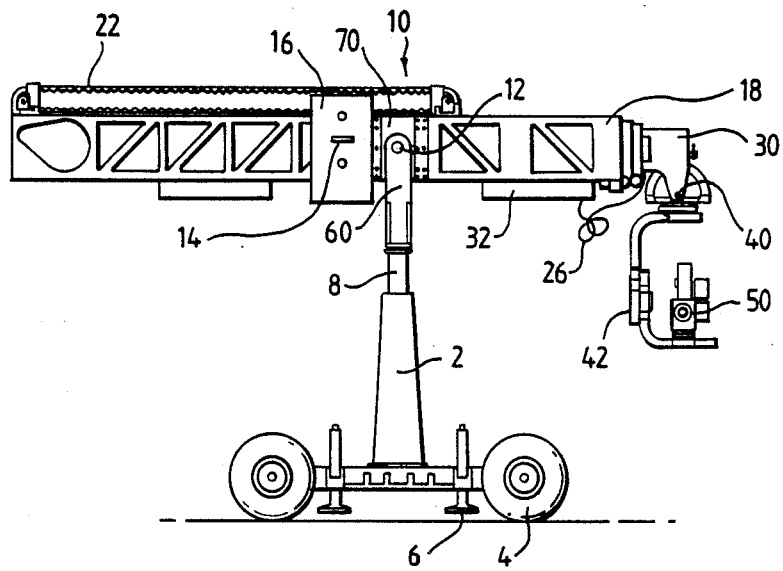
FIG. 1 is a side view of a camera crane with a telescopic boom, shown contracted, to which crane the levelling system of the invention may be fitted.

The camera crane illustrated in FIG. 1 comprises a base 2 which is supported on wheels 4 and is further provided with feet 6 which may be lowered to make contact with the ground in order to stabilise the crane. The base may also be fitted with wheels which allow it to run along a track.

The support 2 carries a vertical support shaft 8 about which a boom assembly 10 of the crane can be slewed. The boom assembly is mounted directly above the support on a horizontal pivot 12. The boom is balanced so that it can be elevated manually to produce a luffing motion.

Figure 3:
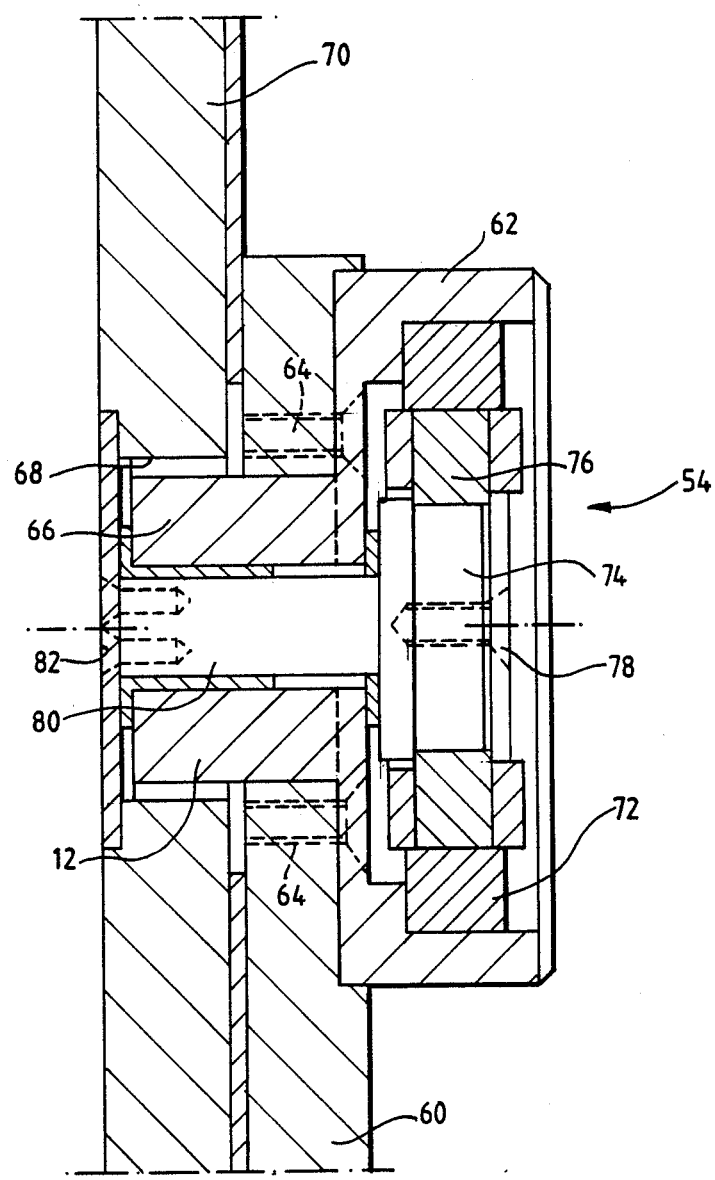
FIG. 3 a detailed sectional view through the mounting of the boom of the crane of FIG. 1 to the support.

FIG. 3 illustrates in more detail the construction of the pivot 12 showing how a tachometer 54 is coupled directly to the horizontal pivot of the boom. The support shaft 8 carries a pivot support arm 60 to which a housing 62 of the tachometer is fixedly secured by means of two screws 64. The screws 64 are received in the support arm at either side of an opening through which an annular sleeve 66 of the housing 62 passes and projects into a recess 68 defined in a beam cradle 70 which is itself fixedly secured to a central portion of the boom. An annular ring 72 defining a series of permanent magnet poles is mounted inside the tachometer housing 62 and surrounds a rotor 74 which carries rotor windings 76 at its outer periphery. The rotor 74 is fixedly secured by means of screw 78 to a shaft 80 which is supported in a journal bearing within the sleeve 66. The shaft 80 is fixedly secured by means of a screw 82 to the base of the recess 68 in the beam cradle 70. With this arrangement when the boom and therefore the beam cradle 70 are rotated about the pivot 12, the rotor 74 with its winding 76 which is fixedly connected to the beam cradle is rotated within the stator in order to produce an output signal, the voltage of which is proportional to the speed of the relative motion. It will be appreciated that the tachometer 54 operates on conventional generator principles and that the output is taken from the rotor winding 76 by means of commutators and brushes. This output is fed by a cable to the control electronics which will be described in more detail later. A suitable tachometer for this purpose is manufactured by SIERRACIN/MAGNEDYNE of Carlsbad, Calif., U.S.A. under Model No. TE4403-11.

To the left of the support, as seen in FIG. 1, the boom carries a counterbalance carriage comprising laterally projecting arms 14 on which counterweight plates 16 may be secured on each side of the boom. The arms 14 are supported on a belt 22 which is driven when the boom is extended so that the position of the counterweights can be controlled in order to always exactly balance the moment created by the weight of the camera equipment at the end of the boom.

The right hand side of the boom, as seen in FIG. 1, comprises a number of nested telescopic sections 18A, 18B, 18C. Each section is supported inside its outer adjacent section by means of wheels 20 bearing on guide rails. The extension of the telescopic boom sections is controlled by means of a motor 86 mounted between side plates 88 at the end of the boom opposite the remote head. The arrangement of the motor and the associated drive for the telescopic boom sections and the counterbalance carriage is shown in more detail in FIGS. 4 and 5. The motor 86 supplies drive via two toothed belts 90 92 to a shaft 96 carrying six pulleys 98. Each pulley carries a respective cable 100 which extends or retracts one of the three movable sections 18A, 18B, 18C of the boom. A triplex chain drive 102 provides drive to the toothed belt 22 which carries the counterbalance carriage. The mechanical arrangement is such that as the motor drives the telescopic sections of the boom outwardly, the counterbalance carriage is moved backwards towards the motor 86 in order to maintain the crane in perfect balance at all times. Similarly the movement of the counterbalance carriage is reversed when the boom is retracted.

It will be appreciated that the mechanism for driving the boom in extension is not material to the levelling system which represents the subject matter of the present invention and it will not therefore be described in any further detail. Other arrangements to that outlined above may be employed for extending and contracting the boom.

A levelling head 30 is removably attached to the end of the innermost boom section 18C. A control cable 26 for carrying electrical control signals is connected by a multipin plug and socket type connector to the levelling head to provide power and control signals. The other end of the cable 26 is connected to a housing 32 fixed to the boom in which the control electronics for the motor 86 and the levelling system are installed. The cable is of sufficient length to provide no restriction on the extension or contraction of the boom.

Figure 2:
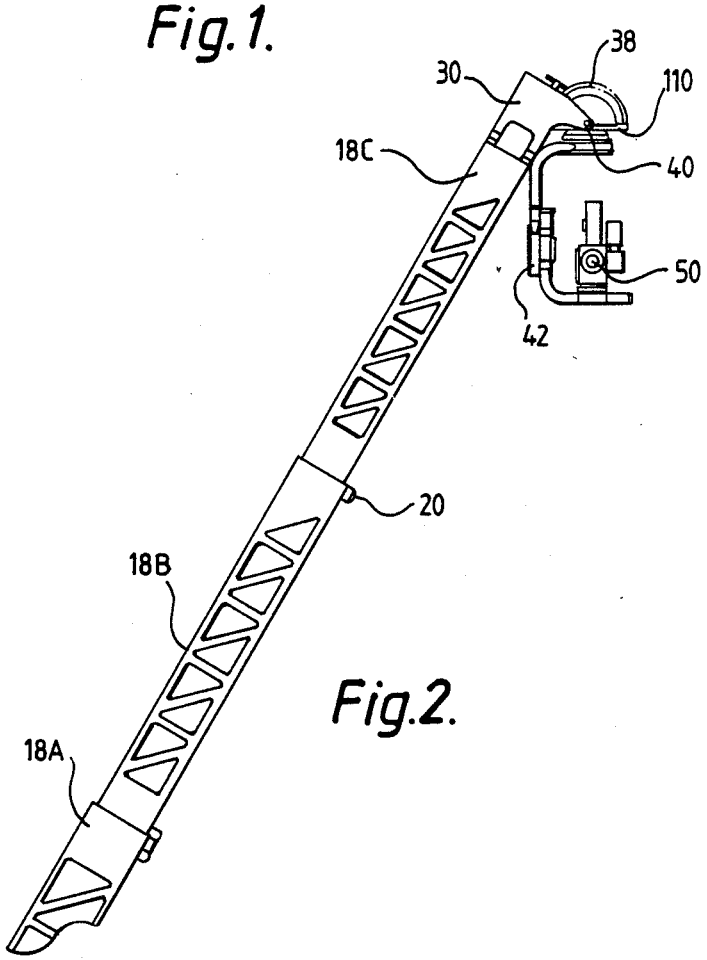
FIG. 2 is a portion of the boom extended and in an elevated position showing the relative position of the camera remote head and boom.
Figure 6:
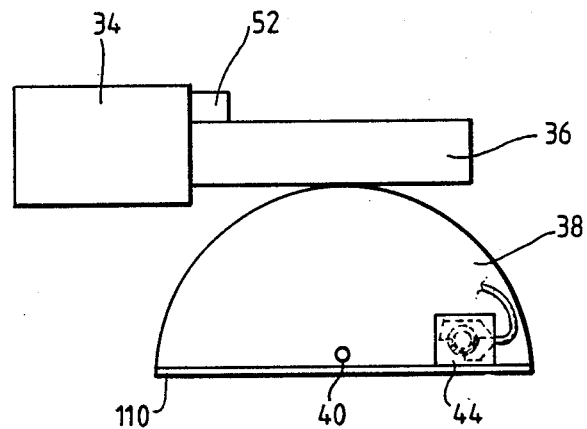
FIG. 6 is a diagrammatic illustration showing components of the levelling head.

In the levelling head there is provided a motor 34 (FIG. 6) which is supported on the inside of the housing of the levelling head. The motor is preferably a low-speed DC motor which is relatively noiseless. The motor 34 drives a worm 36 which is coupled to a semi-circular section worm gear 38, the base of which defines a levelling plate 110. The worm gear 38 is pivotally mounted by means of a shaft 40 to the housing of the levelling head. A removable camera remote head 42 is directly secured to the levelling plate 110 so that as the worm gear is pivoted relative to the remote head the camera remote head maintains its alignment parallel to a diameter of the worm gear 38. This effect can be seen by the relative positions of the camera remote head and worm gear in FIGS. 1 and 2 where the boom has moved from a horizontal to an elevated position. It will be noted that the levelling plate 110 is maintained horizontal at all times providing a fixed reference for all camera movements. A level sensor 44 is fitted to the worm gear and electrical connections to the level sensor are made via the control cable 26. The level sensor may, for example, be a sensitive mercury tilt switch of the type comprising a glass ring containing a slug of mercury. The ring is provided with three contacts at the appropriate positions. This ring is mounted in a block of epoxy resin which can be machined so that when the level sensor is mounted to the worm gear 38 the plane of the ring is precisely perpendicular to the levelling plate 110. In this position the slug of mercury does not make contact with either of the two outer contacts.

Depending on the purpose for which the crane is being used various different types of camera remote head 42 may be employed. A camera 50 is supported on the remote head 42 and is fixed in position so that, when the remote head is fitted to the levelling plate 110 of the levelling head 30 the camera is level in a reference position of the worm gear. A tachometer or shaft encoder 52 is associated directly with the output shaft of the motor which drives the worm 36 in order to provide an electrical control signal indicative of the position and speed of movement of the worm and, therefore, the position of the worm gear 38 and levelling plate 110. The tachometer 52 may have a similar construction to the tachometer 54 already described with reference to FIG. 3. On setting up the system for a particular remote head and camera the 'zero' output from the level sensor is used to provide a reference so that the signals produced by the tachometers 52 and 54 can be utilized to provide an indication of the positions of the boom and worm during subsequent motion of the crane. Electrical connections to this tachometer or shaft encoder 52 are made via the cable 26. The zero or reference position of the shaft encoder is set as the position of the worm when the worm gear 38 and remote head 42 are precisely level as detected by the level sensor 44.

Figure 4:
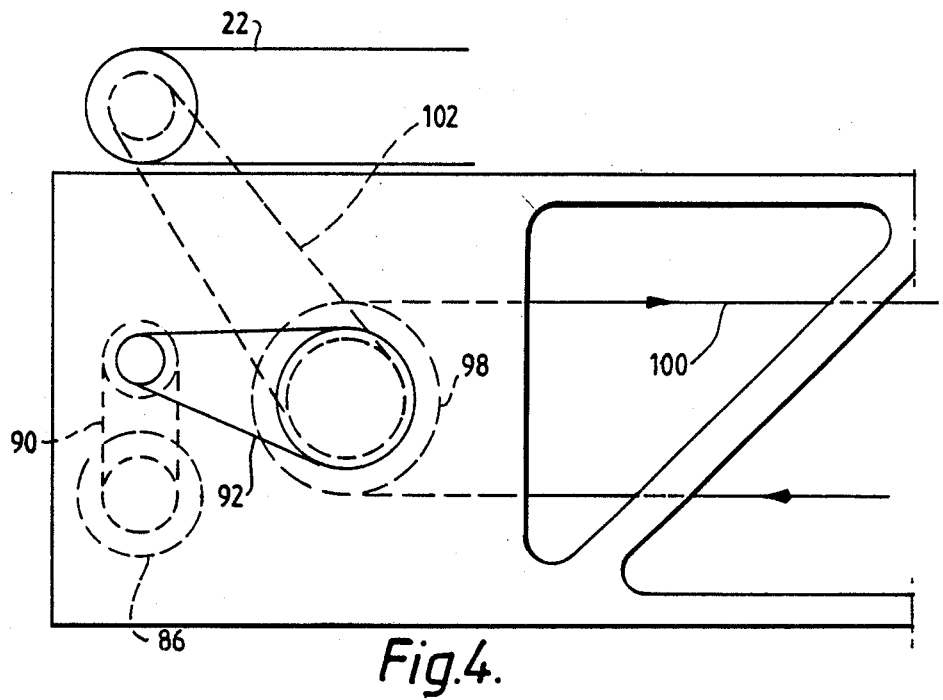
FIG. 4 a diagrammatic side view of the end of the boom opposite the remote head.
Figure 5:
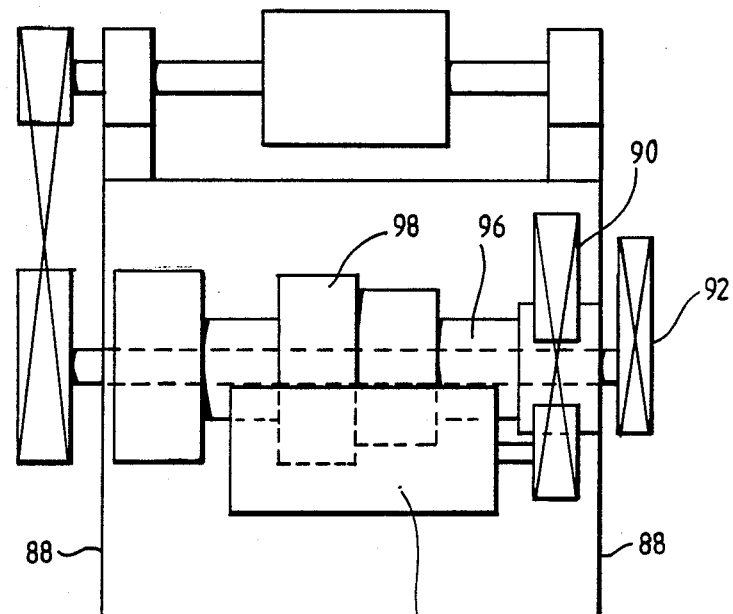
FIG. 5 is a diagrammatic end on view of the portion of the boom shown in FIG. 4.

The control electronics for the levelling system will now be described with reference to FIG. 4.

Figure 7:
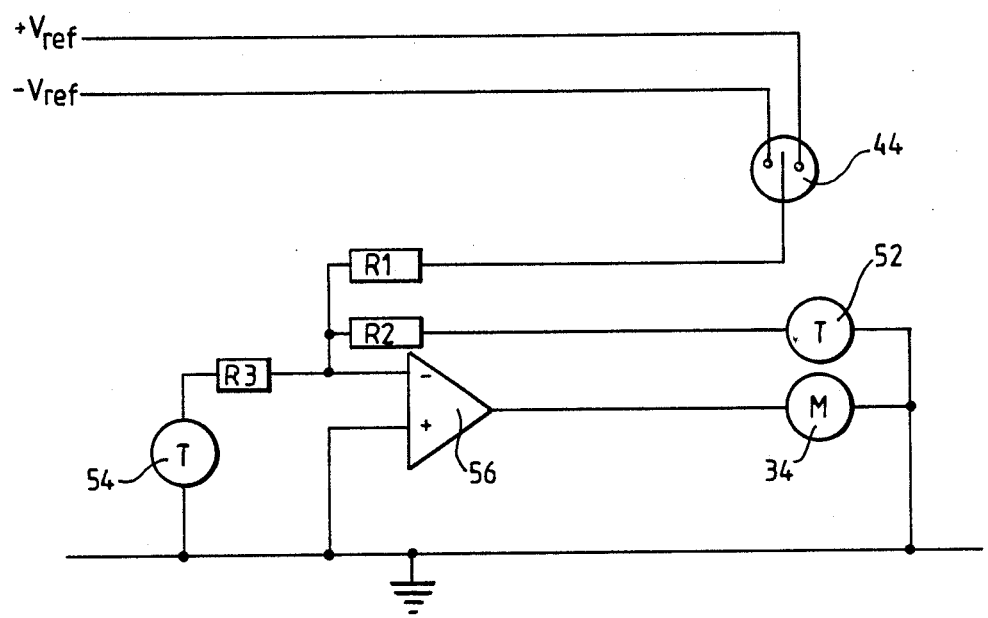
FIG. 7 is a circuit diagram showing the basic principle of the circuit of the levelling system of the invention.

The motor 34 in the levelling head is controlled from the output of the two tachometers 52 and 54 by means of a DC linear servo-amplifier 56. The primary control is from the tachometer 54 which is associated with the horizontal pivot 12 for the boom. The output of this tachometer provides a DC voltage signal which is proportional to the angular speed of movement of the boom as it is moved to vary the angle of elevation of the camera. The output from the tachometer 54 is connected to the input of the servo-amplifier 56 by means of a resistor 58. Feedback from the level sensor 44 and the tachometer 52 is also provided. These feedback signals are fed via respective resistors into the input of the servoamplifier. As illustrated in FIG. 7 the level sensor 44 is a mercury switch which connects either a positive or negative $V_{ref}$ to the input of the servo-amplifier whenever the worm gear 38 is out of level in one or other sense. Such a mercury switch is able to detect an out-of-level condition to within 0.5°. The tachometer 52 provides a signal which is intended to offset that of the input from the tachometer 54 when the boom and worm are moving in precise synchronism to maintain the camera remote head level. When the motions of the boom and camera remote head become out-of-step the sense of the resulting signal fed to the servo amplifier is such as to increase or decrease the speed of the motor 34.

It will be appreciated that by means of this simple electrical circuit it is possible to provide a significant improvement over prior art systems which required a mechanical linkage between the camera levelling head and the horizontal pivot of the crane. The elimination of such a mechanical linkage frees the director to use boom extension and contraction as well as slewing and luffing motion to create dramatic effects without the camera ever moving detectably out-of-level.

The electronic control could be implemented by means of a digital circuit instead of the analogue circuit described by the use of digital output shaft encoders. The components of the circuit may be varied so that an AC servo-amplifier or switched DC servo-amplifier could be used in a modified circuit working in accordance with the same operating principle. A stepper motor or AC motor could be used in place of DC motor 34. The motor should be noiseless as far as possible so as not to interfere with the action being filmed.

I claim:

1. A levelling system for use with a camera crane having a telescopic boom, the system including
   first sensing means comprising means for operative connected directly to a horizontal pivot of a camera crane in order to produce an output signal representative of the rate of change of angle of elevation of the boom,
   a levelling head adapted to be fitted to an end of the boom, the levelling head housing
   a motor
   a worm driven by said motor,
   a worm gear coupled to said worm and provided with means whereby a camera remote head can be fixedly mounted thereto, and second sensing means associated with said motor for providing an output signal proportional to the rotational speed of said worm, and
   a servo-amplifier having inputs connected to said first and second sensing means for producing an output signal for controlling said motor whereby the movement of the worm is maintained directly proportional to the movement of the boom about the horizontal pivot in order to maintain a camera remote head mounted to said worm gear continuously in the same orientation.

2. A system according to claim 1, further including a level sensor directly mounted to said worm gear and providing an output signal connected to an input of said servo-amplifier.

3. A system according to claim 2, wherein said level sensor is a mercury switch.

4. A system according to claim 1, wherein the or each said sensing means comprises a tachometer or a shaft encoder.

5. A system according to claim 1, wherein said motor is a DC motor.

6. A levelling system for use with a camera crane having a telescopic boom mounted on a horizontal pivot, the system comprising a levelling head adapted to be fitted to the boom and provided with a motor and a camera remote head mounting operatively connected to said motor to enable the mounting to be rotated about a horizontal axis, a control circuit for providing control signals to said motor, respective sensing means for direct association with a boom pivot and said motor operative to provide input signals to said control circuit, said control circuit being operative to maintain a camera remote head mounted to said mounting level during all motions of the crane.

* * * * *